UNITED STATES PATENT OFFICE.

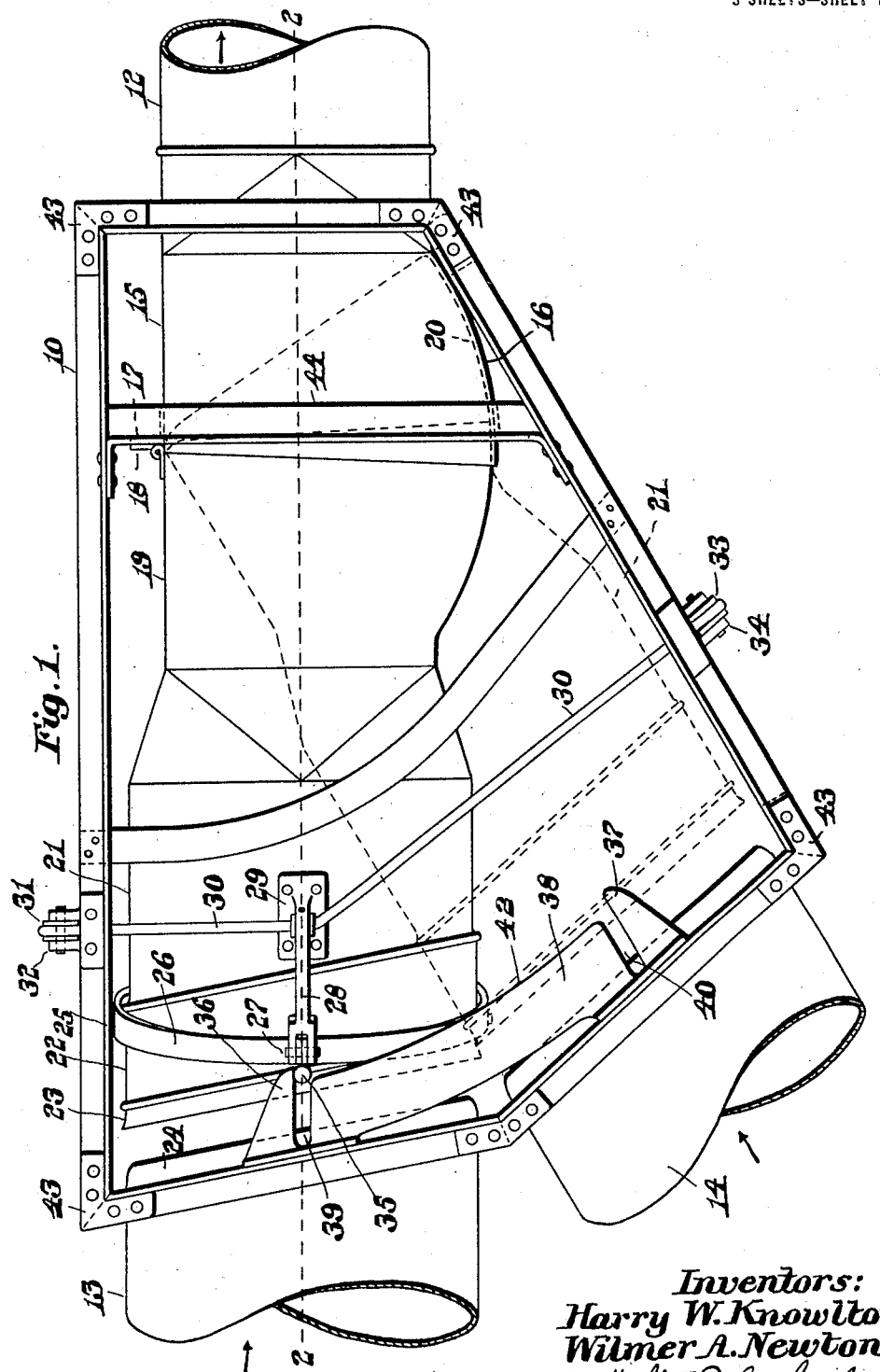

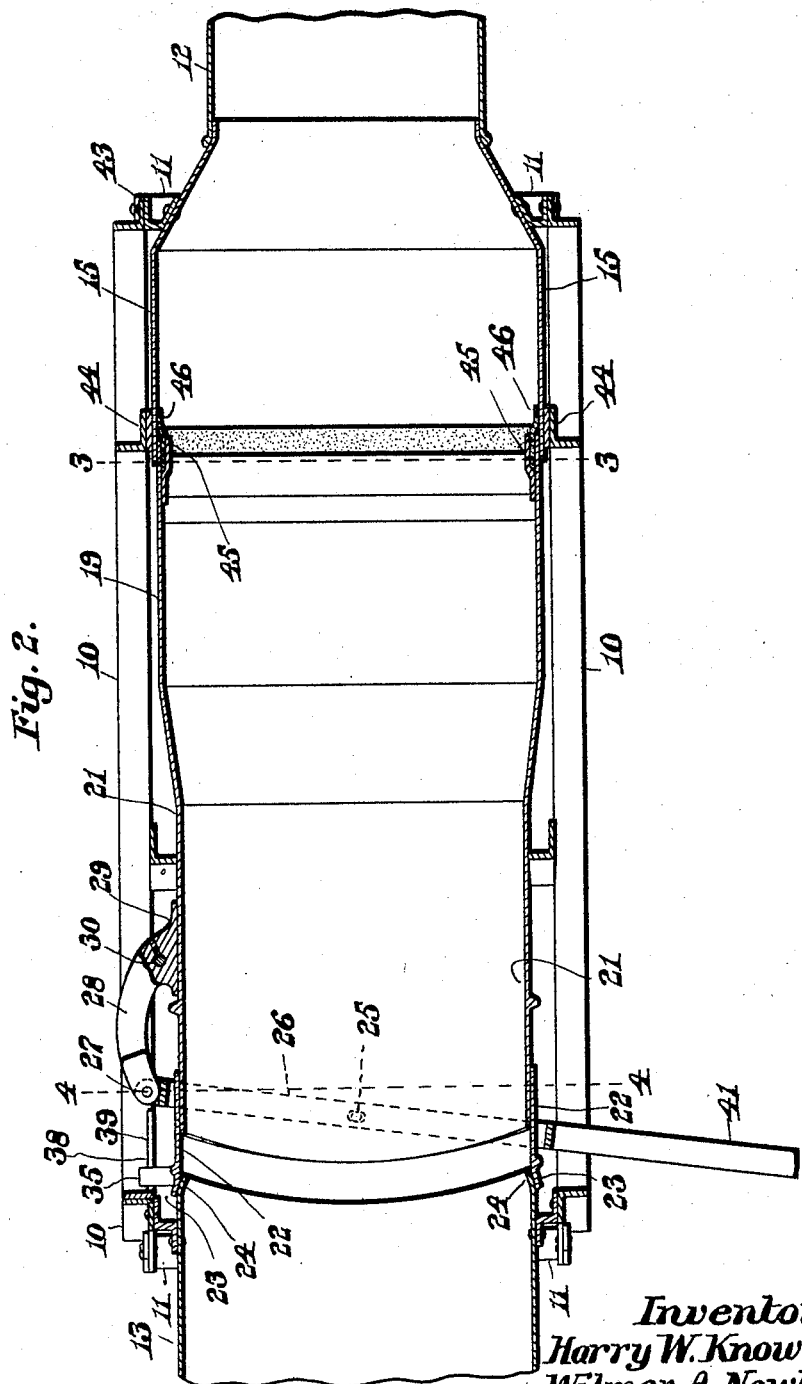

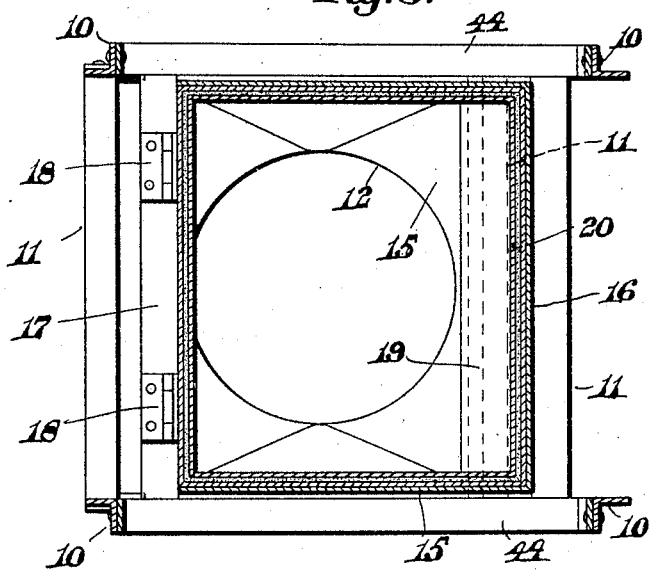
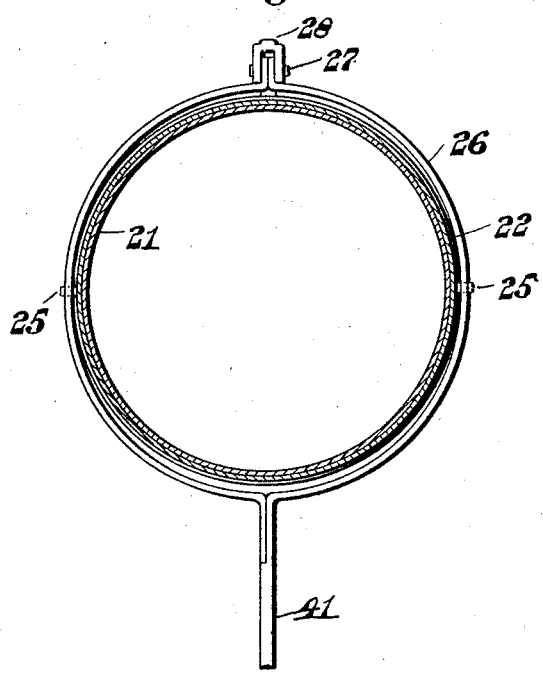

HARRY W. KNOWLTON AND WILMER A. NEWTON, OF LOWELL, MASSACHUSETTS, ASSIGNORS TO KNOWLTON & NEWTON CO., INC., OF LOWELL, MASSACHUSETTS, A CORPORATION OF MASSACHUSETTS.

PIPE-SWITCH.

1,400,609.  Specification of Letters Patent.  Patented Dec. 20, 1921.

Application filed January 10, 1921. Serial No. 436,400.

*To all whom it may concern:*

Be it known that we, HARRY W. KNOWLTON and WILMER A. NEWTON, citizens of the United States of America, and residents of Lowell, in the county of Middlesex and State of Massachusetts, have invented certain new and useful Improvements in Pipe-Switches, of which the following is a specification.

This invention relates to switches for pipes used in mills for conveying different materials to various portions of the plant and it has for its object the provision of an air tight switch of this character which may be moved to connect one pipe with either of two or more other pipes without breaking its connection with the first-mentioned pipe.

Another object of the invention is to provide a means for preventing the side walls of the switch from bulging outwardly under pressure.

A further object of the invention is to provide a means for registering the movable end of the switch with the pipe to which it is to be connected.

A further object of the invention is to provide a means on the end of the movable part of the switch for making a tight connection with either of the coacting pipes when alined therewith.

The invention consists in certain novel features of construction and arrangement of parts which will be understood readily by reference to the description of the drawings and to the claims to be hereinafter given.

For the purpose of illustrating the invention, one preferred form thereof is illustrated in the drawings, this form having been found to give satisfactory and reliable results although it is to be understood that the various instrumentalities of which the invention consists can be variously arranged and organized and the invention is not limited to the precise arrangement and organization of these instrumentalities as herein shown and described except as required by the scope of the appended claims.

Of the drawings:

Figure 1 represents a plan view of a pipe switch embodying the principles of the present invention.

Fig. 2 represents a vertical section of the same on line 2, 2, on Fig. 1.

Fig. 3 represents a transverse vertical section of the same on line 3, 3, on Fig. 2, and Fig. 4 represents a transverse vertical section of the same on line 4, 4, on Fig. 2.

Similar characters indicate like parts throughout the several figures of the drawings.

In the drawings, 10—10 are two open frameworks secured together by means of transverse braces 11.

Between the frames 10—10 and secured thereto are the alined pipes 12 and 13.

There is also positioned between the frames 10—10 and secured thereto, a branch pipe 14 preferably of the same diameter as the pipe 13.

The pipe 12 has its inner end made rectangular in cross section as indicated at 15 with one wall of said rectangular portion curved as indicated at 16 in Fig. 1 of the drawings.

To the cross member 17 of the frames 10—10 are secured hinges 18, and these hinges have secured thereto an oscillating compartment 19 rectangular in cross section and having one wall 20 thereof curved to fit the curved wall 16 of the rectangular portion 15.

The opposite end of the compartment 19 is provided with a tubular extension 21 and on this tubular extension is mounted a slidable sleeve 22 the outer end of which is flaring as indicated at 23 and is adapted to fit over the reduced end 24 of either the pipe 13 or the pipe 14 as the case may be.

The sleeve 22 is provided with trunnions 25 which extend through bearings in a ring 26 encircling said sleeve 22 and pivoted at 27 to an arm 28 formed upon a plate 29 secured to the extension 21.

A cord 30 or other flexible member extends through an opening in the arm 28 and is secured thereto.

One end of the cord 30 extends over a sheave 31 secured in a bracket 32 to one side of the upper frame 10 while the other end of the cord 30 extends over a sheave 33 revolubly mounted in a bracket 34 secured to the opposite side of the upper frame.

By pulling downwardly on the ends of the cable 30 the compartment 19 may be swung about the pivot of the hinged connection 18 to bring the extension 21 thereof into alinement with either the pipe 13 or the pipe 14.

The sliding sleeve 22 is provided with a projection 35 which coacts with the stop projections 36 and 37 of a plate 38 secured to the upper frame 10, these projections 36, 37 coacting with the projections 35 limiting the swinging movement of the extension 21 in either direction.

The plate 38 is provided with slots 39 and 40 extending parallel with the axes of the pipes 13 and 14 so that when the projection 35 is in contact with either stop shoulder 36, 37, the operator by means of the handle 41 may move the ring 26 about its pivot 27 and cause the sleeve 22 to be moved endwise of the extension 21 until the flaring mouth 23 thereof is firmly forced over the reduced end 24 of the pipe 13 or the similar reduced end of the pipe 14.

The inner edge 42 of the plate 38 is curved and the projection 35 is in contact with this curved edge during its movement from alinement with the pipe 13 to a position in alinement with the pipe 14 or vice versa.

It is obvious therefore that the sleeve 22 cannot be moved endwise of the extension 21 except when in alinement with either the pipe 13 or the pipe 14.

The framework 10 is preferably made up of stiff angle irons the corners of which are connected by plates 43 riveted thereto.

Opposite the top and bottom of the oscillating compartment 19 and the rectangular portion 15 of the pipe 12 are two cross members 44 which bear against the walls of the rectangular portion 15 and prevent said walls from bulging outwardly under the great pressure contained within the compartment when material is being blown through said compartment from the supply pipe 13 or the supply pipe 14 to the delivery pipe 12 or vice versa.

While in the drawings the pipes 13 and 14 are shown as supply pipes and the pipe 12 as a delivery pipe and are so mentioned in the claims, it is obvious that with the minor changes the pipe 12 may constitute the supply pipe and the other pipes 13 and 14 may be delivery pipes.

Applicant therefore does not desire to limit himself to a construction in which two supply pipes are adapted to be connected alternately with a delivery pipe but wishes it understood that the claims as drawn are intended to cover also a construction in which a single supply pipe is adapted to feed material to either of two delivery pipes, the terms "supply" and "delivery" mentioned in connection with the various pipes only being used as a matter of convenience to more clearly distinguish the same.

While one form of oscillating compartment is shown in the drawings and described in the specification, it is obvious that this oscillating compartment may be constructed in many other ways to accommodate itself to various conditions and the pivot for said oscillating compartment may be as shown in the drawings at one side of the compartment or located in other positions relatively to said compartment as circumstances require.

The inner end of the oscillating compartment 19 has secured thereto a band 45 between which and the inner wall of the oscillating compartment 19 is a packing member 46 of felt or other similar material which by the pressure within the compartment 19 and the pipe 12 is forced into contact with the inner wall of the rectangular portion 15 of said pipe 12 and makes a tight joint at all times thereby preventing any leakage of material at this point.

By means of this construction a perfectly tight switch is provided for use in connection with a system of piping used in mills for delivering different materials to various parts of the plant.

Heretofore in systems of this character, damper switches have been used which are liable to collect portions of the material passing through the pipes and subsequently mix them with other materials which may be forced through the pipes.

This is obviously objectionable and is wholly overcome by the present construction of switch.

Moreover in the switches heretofore in use the great pressure caused by the material being forced through the pipes was liable to bulge out the walls of the switches and make the same inoperative or cause an imperfect action thereof.

This bulging of the walls of the switch is effectually prevented by means of the open framework 10 on opposite sides of the switch, said framework 10 being tied together by the braces 11 which retain them in spaced relation to each other under all conditions of pressure.

It is believed that the operation and many advantages of the invention will be understood without further description.

Having thus described our invention, we claim:

1. The combination of a delivery pipe; an oscillating compartment communicating continuously therewith and provided at its opposite end with a tubular extension; two supply pipes with either of which said extension is adapted to be alined; and a cylindrical member slidable endwise of said extension and adapted to make a tight connection with either of said supply pipes.

2. The combination of a delivery pipe; an oscillating compartment communicating continuously therewith and provided at its opposite end with a tubular extension; two supply pipes with either of which said extension is adapted to be alined; a cylindrical member slidable endwise of said extension; and means attached to said extension for moving said cylindrical member into conjunction with either of said supply pipes.

3. The combination of a delivery pipe, an oscillating compartment communicating continuously therewith and provided at its opposite end with a tubular extension; two supply pipes with either of which said extension is adapted to be alined; and a framework upon opposite sides of said compartment to prevent the bulging of the side walls of said compartment.

4. The combination of a delivery pipe; an oscillating compartment communicating continuously therewith and provided at its opposite end with a tubular extension; two supply pipes with either of which said extension is adapted to be alined; and a framework secured to said pipes upon opposite sides of said compartment to prevent the bulging of the side walls of said compartment.

5. The combination of a delivery pipe; an oscillating compartment communicating continuously therewith and provided at its opposite end with a tubular extension; two supply pipes with either of which said extension is adapted to be alined; and an openwork framework secured to said pipes upon opposite sides of said compartment and provided with transverse braces adapted to prevent the bulging of the side walls of said compartment.

6. The combination of a delivery pipe terminating in a flat sided portion with a curved wall; an oscillating open ended compartment having at one end a curved wall fitted to the curved wall of said pipe and at the other end a tubular extension; two fixed supply pipes; and a member slidably mounted on said extension and adapted to make a tight joint between said extension and either of said supply pipes.

7. The combination of a delivery pipe terminating in a flat sided portion with a curved wall; an oscillating open ended compartment having at one end a curved wall fitted to the curved wall of said pipe and at the other end a tubular extension; two fixed supply pipes; a member slidably mounted on said extension and adapted to make a tight joint between said extension and either of said supply pipes; and means for registering said slidable member in alinement with either of said supply pipes.

8. The combination of two alined separated pipes; a branch pipe at an angle thereto; a compartment disposed between said separated pipes and having a clear unobstructed passage therethrough, one end of which is continuously in communication with one of said alined pipes; means for moving said compartment into position to coact with said branch pipe; and means slidable upon one end of said compartment adapted to make a tight joint with either pipe end adjacent thereto.

Signed by us at 746–7 Old South Bldg., Boston, Mass., this 7th day of January, 1921.

HARRY W. KNOWLTON.
WILMER A. NEWTON.

Witnesses:
WALTER E. LOMBARD,
NATHAN C. LOMBARD.